United States Patent [19]

Chikazawa et al.

[11] Patent Number: 5,764,614
[45] Date of Patent: Jun. 9, 1998

[54] LASER INTENSITY GAIN CONTROL FOR DETECTING OSCILLATION IN THE FEEDBACK CIRCUIT

[75] Inventors: Yoshiharu Chikazawa, Yokohama; Akira Kawamura, Hachiouji, both of Japan

[73] Assignee: Thomson multimedia S.A., Courbevoie, France

[21] Appl. No.: 655,874

[22] Filed: May 3, 1996

[30] Foreign Application Priority Data

May 6, 1995 [FR] France ................... 95 09307

[51] Int. Cl.$^6$ ........................................... G11B 7/00
[52] U.S. Cl. ........................ 369/116; 369/54; 369/106
[58] Field of Search .......................... 369/54, 32, 13, 369/58, 44, 48, 44.25, 44.28, 116, 106

[56] References Cited

U.S. PATENT DOCUMENTS

| 5,539,720 | 7/1996 | Aoi ................................... 369/116 |
| 5,546,372 | 8/1996 | Ohsawa et al. ................... 369/116 |
| 5,550,800 | 8/1996 | Zucker ............................. 369/116 |
| 5,602,814 | 2/1997 | Jaquette et al. ................... 369/58 |

FOREIGN PATENT DOCUMENTS 0557584  9/1993  European Pat. Off.

*Primary Examiner*—Georgia Y. Epps
*Assistant Examiner*—Kim-Kwok Chu
*Attorney, Agent, or Firm*—Joseph A. Tripoli; Frederick A. Wein

[57] ABSTRACT

In laser feedback systems of an optical memory the most suitable feedback gain value depends on the type of optical disks used. According to the invention a system and a method is provided which finds by way of an iteration a suitable maximum feedback gain value so that the feedback system does not oscillate. The method consists in starting with a low gain value for driving a laser diode, increasing the gain value by small amounts until an oscillation detecting unit detects that the laser feedback system is oscillating. Then the gain value is reset to the previous value or a little bit more. Then the laser feedback system is again in a non-oscillating area with a suitable maximum gain value. This iteration is performed by a system consisting mainly of a laser diode, a photodiode for detecting the reflected light, and an oscillation detecting unit which controls a gain controller. This gain controller sets the gain on a multiplier which drives the laser driver for the laser diode.

13 Claims, 3 Drawing Sheets

LASER INTENSITY GAIN CONTROL FOR DETECTING OSCILLATION IN THE FEEDBACK CIRCUIT

BACKGROUND

The present invention relates to a method and a system for controlling the laser feedback of an optical memory system.

In systems for the optical reading or writing of optical memories usually a feedback system is used to adjust the amount of light irradiated by, for example, a laser diode onto an optical disk. If the amount of light irradiated onto an optical disk is too low, the S/N ratio (signal-to-noise ratio) of the resulting signal deteriorates, so that the detection of the digital information becomes complicated. On the other hand, if the amount of light irradiated by the laser diode onto the disk is too high, the laser feedback system starts oscillating with the result that the optical detection system is not in a stable working condition and that the digital information of the optical memory cannot be obtained. Therefore, an optimal amount of light emanating from the laser diode exists, which gives an optimum S/N ratio. Unfortunately, the optimum amount of light, i.e. the most suitable feedback gain value, depends on the disks used. Up to now the laser feedback gain value is set manually to its suitable value depending on the disk used. The operation of manually setting the gain value is a difficult task, because the laser feedback gain value is set to be maximum by observing the eye-pattern, so that the system as a whole does not oscillate. A further disadvantage is, that the system must be manually readjusted if another type of optical disk with different characteristics is used.

SUMMARY OF THE INVENTION

It is therefore an object of the present invention to provide a system and a method for automatically adjusting the laser feedback gain value.

The laser feedback system of an optical memory according to the invention comprises a laser means for generating a laser beam irradiating the optical memory means, a detection means for detecting the light emanating from the optical memory means, an oscillation detecting means connected to the detection means, a gain controlling means connected to the oscillation detecting means, and a multiplying means connected to the detection means and controlled by the gain controlling means, wherein the gain of the laser means set by the multiplying means is controlled by the gain controlling means.

Furthermore the laser means of the laser feedback system can be a laser diode.

Furthermore the detecting means of the laser feedback system can be a photodiode.

Furthermore the laser means of the laser feedback system is driven by a laser driving means which is connected to the multiplying means.

Furthermore the oscillation detecting means of the laser feedback system comprises an envelope detector, a sampling/holder and a comparator.

Furthermore the gain controlling system of the laser feedback system comprises a counter controller, a counter and a D/A converter.

Furthermore the counter and the sampling/holder circuit of the laser feedback system are operated simultaneously by the signal of a clock oscillator.

The method for operating a laser feedback system of an optical memory means according to the invention, wherein the light emanated from the optical memory means, which is irradiated by a laser means, is fed back to the laser means, the feedback system comprises an oscillation detecting means which detects if the feedback system is oscillating or not, and wherein an optimum gain of the laser means is achieved with an iterative method using the information of the oscillating detection means whether the feedback system is oscillating or not.

Furthermore in the method for operating a laser feedback system the feedback system starts with a predetermined gain value, upon detection of a non-oscillating state of the feedback system the gain of the laser means is gradually increased, and upon detection of an oscillating state of the feedback system the gain is gradually decreased.

Furthermore in the method for operating a laser feedback system the method starts with a gain value so small that the system will not oscillate.

Furthermore in the method for operating a laser feedback system the gain value is gradually increased by a first predetermined amount as long as the oscillation detecting means does not detect an oscillating state of the feedback system, the gain value is decreased by a second predetermined amount when the oscillation detecting means detects an oscillation state of the feedback system, and then the resulting gain value is latched.

Furthermore in the method for operating a laser feedback system the first and second predetermined amounts are equal.

Furthermore in the method for operating a laser feedback system the first and second predetermined amounts can be set externally.

BRIEF DESCRIPTION OF THE DRAWING

A preferred embodiment of the system and the method for the laser feedback of an optical memory will be described in detail with reference to the accompanying drawings in which.

DESCRIPTION OF THE PREFERRED EMBODIMENTS

Figure 1:
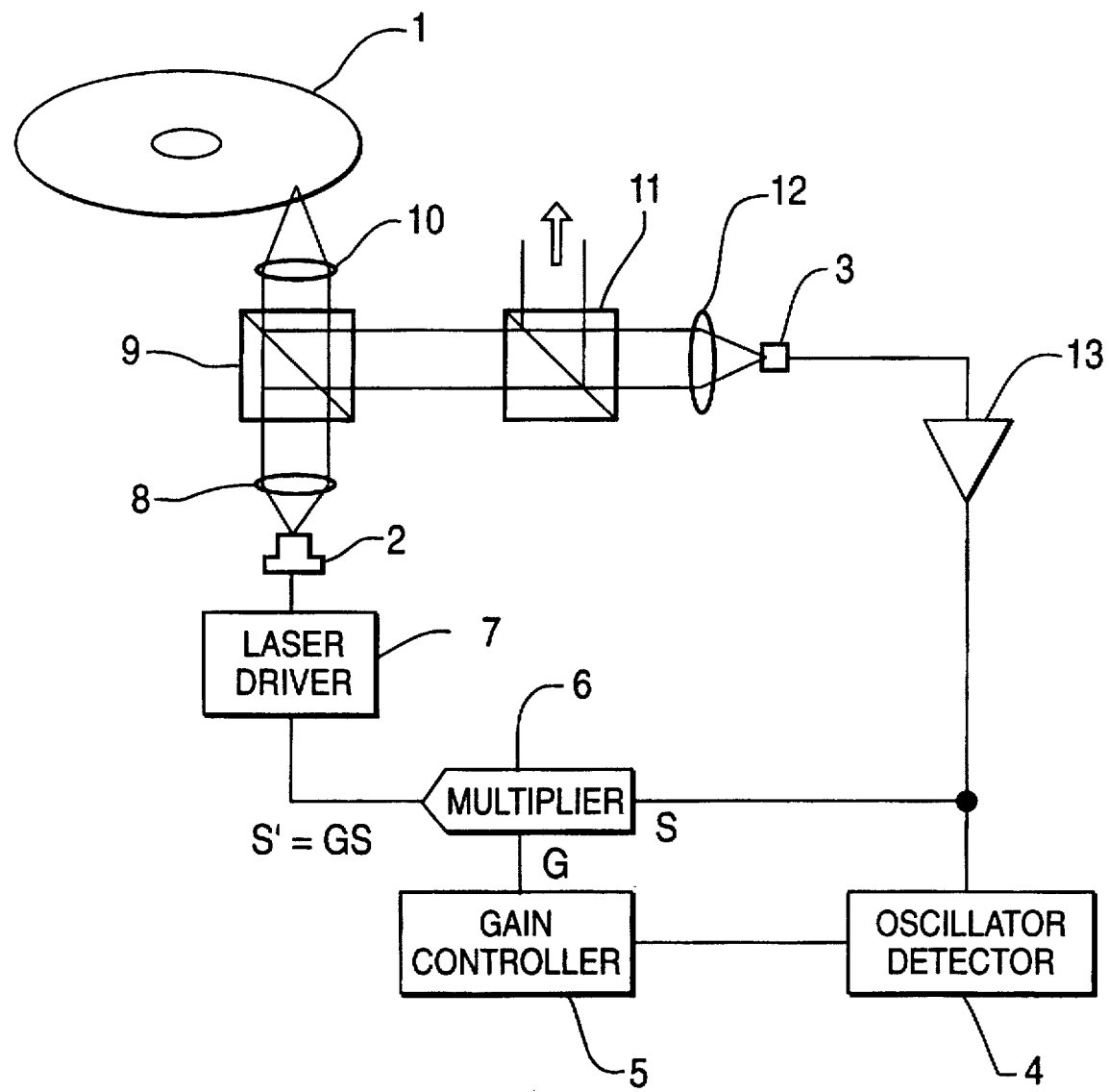
FIG. 1 is a block diagram of an active gain control for a laser feedback system.

The FIG. 1 shows a block diagram for the principle explanation of an automatic gain control (AGC) for a laser feedback system used in connection with an optical memory like an optical disk. A laser diode 2 generates a laser beam which irradiates the surface of an optical disk 1. The basic feedback system consists of a photodiode 3 which receives the reflected light from the disk 1. The resulting signal is inputted parallel to an oscillation detector 4 and to a multiplier 6. The output of the multiplier 6 is inputted to a laser driver 7, which drives the laser diode 2. The oscillation detector 4 detects whether the feedback system oscillates or not and generates an output signal which is inputted to a gain controller 5. The output signal of the oscillation detector 4 basically includes three information items, namely no oscillation occurs, feedback oscillation does occur, and to latch the present gain.

According to this information the gain controller 5 controls the gain value of the multiplier 6 in the following way.

If the information signal contains the information that no oscillation of the feedback system occurs, the gain of the multiplier is increased by a predetermined amount. The resulting signal of the multiplier 6 is fed to a laser driver 7 which drives the laser diode 2. According to the increase in gain the laser diode generates more light. This increase in gain is continued step by step until the oscillation detector 4 detects the presence of oscillations in the feedback system. Then the gain controller 5 receives the information that oscillations do occur and decreases the gain of the multiplier 6 by a predetermined amount. Thereby the amount of decrease in gain can differ from the amount of increase in gain of the first part of the iteration. According to the decrease in gain the laser diode now generates less light than in the previous step. If the amount of increase and decrease are the same or the amount of decrease is larger than the amount of increase, then the feedback system is now after this one decrease step B in a stable, non-oscillating state. The feedback system further comprises lenses 3, 8 and 10, beamsplitters 9 and 11, and an amplifier 13 for the amplification of the photodiode signal.

Figure 4:
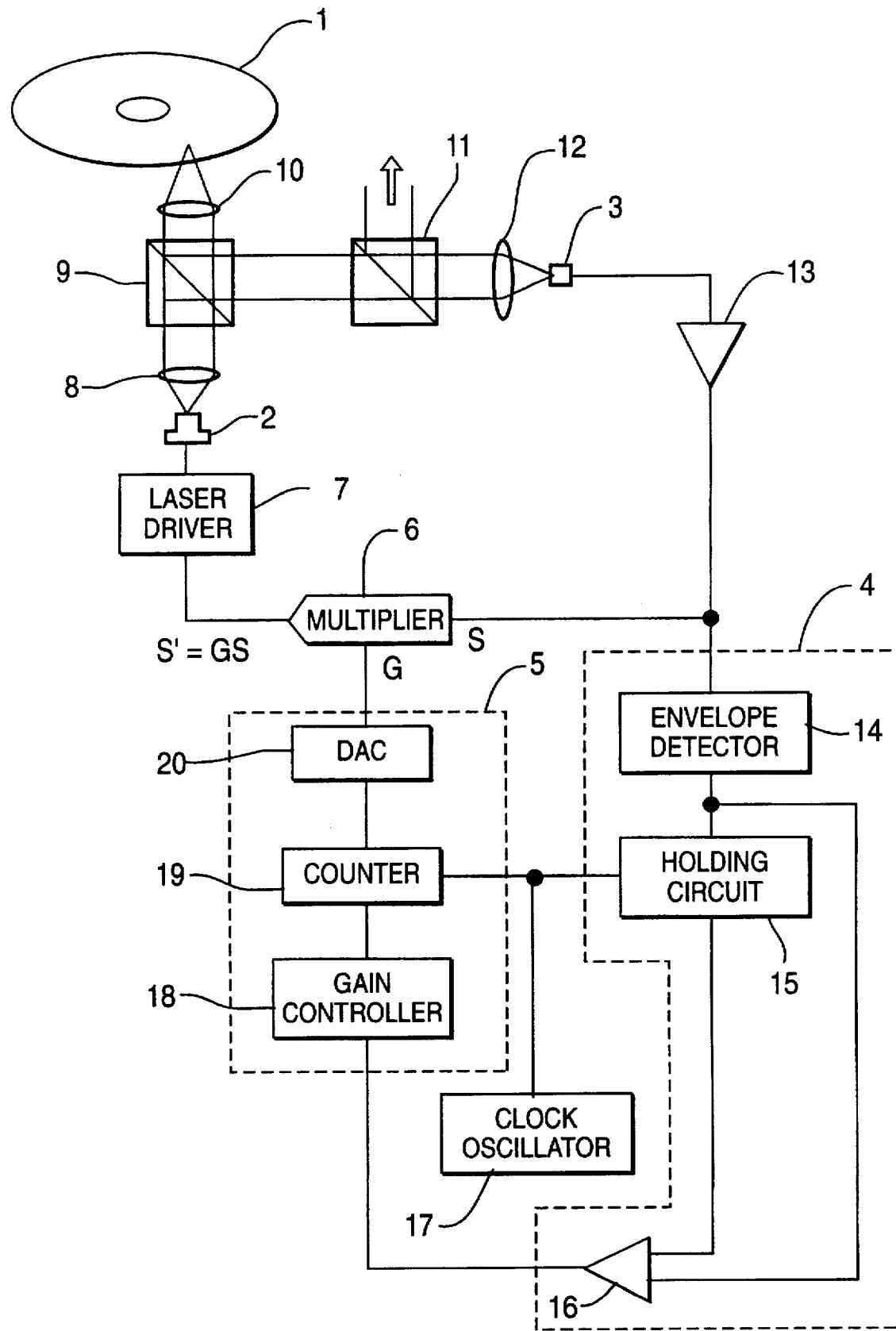
FIG. 4 shows an example of a block diagram of an active gain control for laser feedback in more detail.

A more detailed explanation of the elements 4 and 5 is given in the description of FIG. 4.

Figure 2:
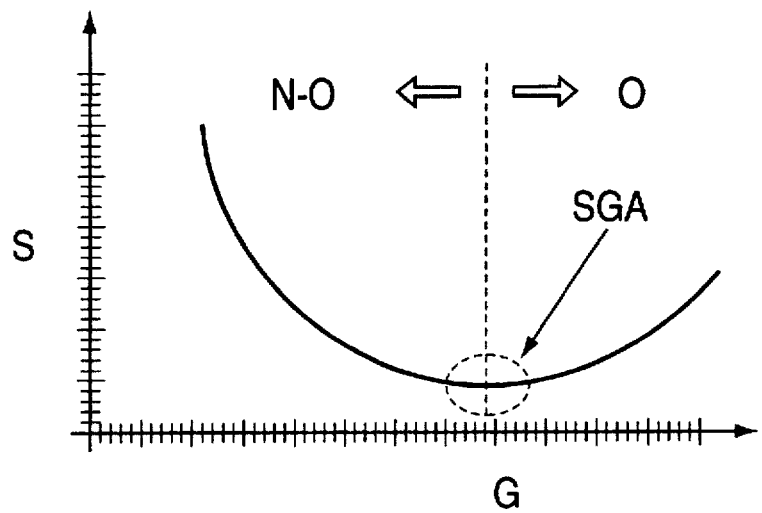
FIG. 2 shows the photo detector signal S versus the amplifier gain G.
Figure 3:
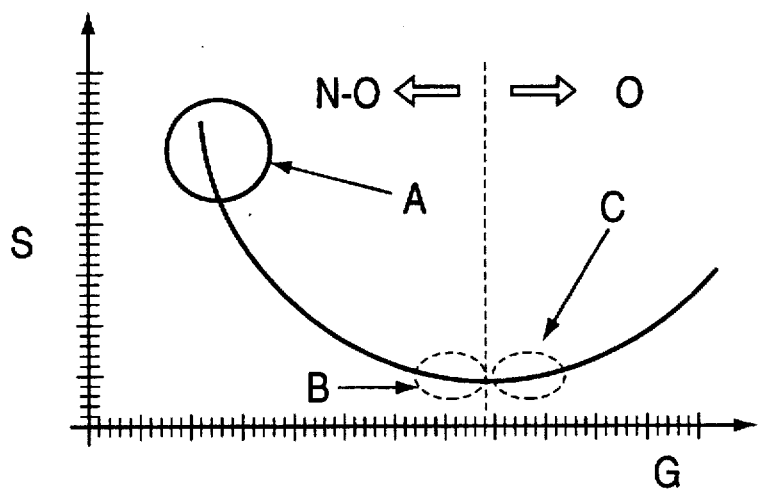
FIG. 3 shows the multiplier gain versus the photo detector signal.

Together with FIG. 2 and FIG. 3 a more detailed explanation of the method is given. FIG. 2 shows the photo detector signal S versus the amplifier gain G, where the photo detector signal S is standardized to the laser light intensity. Therefore at low amplifier gain G the standardized signal is large but involves a low S/N ratio. Until the minimum photo detector signal S on the left side of the figure the system is in a non-oscillating normal detected signal area (left hand side of FIG. 2 with the reference sign "N-O"). With the further increase in the photo detector signal as a function of the gain G the system is now in the oscillated area (right hand side of FIG. 2 with the reference sign "O"). Therefore a suitable gain area ("SGA" in FIG. 2) would be the gain area indicated by the dotted line in the vicinity of the minimum of the photo detector signal curve.

FIG. 3 shows in principle the same curve as FIG. 2 but indicating different areas A, B, C to explain the method of iteration for obtaining a suitable maximum gain. At the start time of the system the multiplier gain is so small that photodiode signal S does not oscillate, which is depicted in the area A in FIG. 3. In this situation the gain controller generates a multiplier gain G. The gain controller increases the multiplier gain G little by little. This means in FIG. 3 that the actual photosignal value (a point on the curve) is moving from area A on the curve to area B. When now the multiplier gain G is so large that the photodiode signal S oscillates, the oscillation detector detects that the photodiode signal, i.e. the whole feedback system, oscillates. This takes place in the area C in FIG. 3. When the gain controller gets the signal from the oscillation detector that the photodiode signal oscillates the gain controller sets the multiplier gain G one step smaller than the present gain, that means it resets the gain value to the preceding gain value, if the increasing and decreasing steps are of the same value. Therefore the multiplier gain is set at area B in FIG. 3. This area B is the suitable maximum gain area and therefore the multiplier gain is set to be constant at this suitable maximum gain area so that the photodiode signal does not oscillate. In other words the oscillation detector compares the photodiode signal (G), where G is the actual (present) gain value, with the photodiode signal S(G'), where G' is the preceding gain value (i.e. just one step before present G). Then the oscillation detector generates the digital information signal. This signal indicates whether the photodiode signal oscillates or not. If S(G) is smaller than S(G'), then G is in normal detected signal area of FIG. 3. The oscillation detector sends the signal, that the photodiode signal does not oscillate, to the gain controller. Then the gain controller sets the gain at the multiplier one step larger.

If S(G) gets larger than S(G'), then this means that G has passed the area B and is now in the oscillating area C of FIG. 3. Then the oscillation detector sends the signal, that the photodiode signal oscillates, to the gain controller. The gain controller then resets the multiplier gain G to the value of G' or a little bit smaller than the value of G'. Therefore the new multiplier gain G (now equal to former G') is now set to be the suitable maximum gain in the area B of FIG. 3.

After iterating this suitable maximum gain signal G the gain controller latches the thus obtained gain value for future use on this particular type of disks. It is also possible to run this iteration every time when a disk is changed.

FIG. 4 shows a more detailed block diagram of an automatic gain control for laser feedback systems. Means having same functions as the means of the embodiment of FIG. 1 are marked with same reference numbers.

The laser diode 2 emits light which passes the lens 8, the multi-purpose beamsplitter 9 and is focussed by the lens 10 onto the information carrying surface of the optical disk 1. The reflected, information carrying light passes again the lens 10 and is reflected on the 45° plane of the multi-purpose beamsplitter 9 in a perpendicular direction. The reflected light is split by the use of a second beamsplitter 11 into one beam which is directed to an optical detecting system for detecting the phase pit signals (not shown in the figure), i.e. for detecting the information and in a second beam which passes the beamsplitter 11 and the further lens 12 and is incident upon a photodiode 3. The signal of the photodiode 3 is usually amplified by the amplifier 13 and is outputted to the multiplier 6 and the oscillation detector 4.

The oscillation detector 4 consists of an envelope detector 14 which detects the form of the photodiode signal. The resulting signal is then given to a sampling and holding circuit 15, which stores the previous envelope signal, and to a comparator 16 which compares the previous signal with the present signal.

The output of the comparator 16 is connected to the gain controller 5, which consists of a counter controller 18 followed by a counter 19 and a digital to analog converter 20.

Both the counter 19 and the sampling and holding circuit 15 are operated simultaneously by the signal of a clock oscillator 17.

If the comparison of the actual photodiode signal and the previous photodiode signal gives the result that the system is not in oscillating state then the counter controller 18 increases the counter by one so that the multiplier gain of multiplier 6 is increased. If the comparator 16 outputs that an oscillating state has occurred then the counter controller 18 decreases the counter value of the counter 19 by one so that the gain of the multiplier 6 is decreased by a one step, which results that the system is now again in the stable area B. This value is then latched and used for the optical memory disk used in the system.

With the above described iterative method a laser feedback system can be realized which automatically sets the optimum gain value of the feedback depending on the type of optical disks used.

We claim:

1. Laser feedback system for an optical memory means comprising a laser means for generating a laser beam irradiating the optical memory means, a detection means for detecting the light reflected from the optical memory means, p1 an oscillation detecting means for detecting whether or not the feedback system is oscillating coupled to the detection means, p1 a gain controlling meaning to iterate a maximum gain in a non-oscillating mode of operation coupled to the oscillation detecting means, and a multiplying means coupled to the detection means and controlled by the gain controlling means, wherein the gain of the laser means set by the multiplying means is controlled by the gain controlling means.

2. Laser feedback system according to claim 1, wherein the laser means is a laser diode.

3. Laser feedback system according to claim 1 wherein the detecting means is a photodiode.

4. Laser feedback system according to claim 1 wherein the laser means is driven by a laser driving means.

5. Laser feedback system according to claim 1 wherein the oscillation detecting means comprises an envelope detecting means, a sampling/holder means and a comparator means.

6. Laser feedback system according to claim 1 wherein the gain controlling system comprises a counter controller means, a counter means and a D/A converter means.

7. Laser feedback system according to claim 5 wherein the counter and the sampling/holder are operated simultaneously by the signal of a clock oscillator.

8. Method for operating a laser feedback system of an optical memory means, wherein the light reflected from the optical memory means, which is irradiated by a laser means, is fed back to the laser means, the feedback system comprises an oscillation detecting means which detects whether the feedback system is oscillating or not, and an optimum gain of the laser means is achieved with an iterative method using the information of the oscillating detection means whether the feedback system is oscillating or not.

9. Method according to claim 8, wherein the feedback system starts with a predetermined gain value, upon detection of a non-oscillating state of the feedback system, the gain of the laser means is gradually increased, and upon detection of an oscillating state of the feedback system, the gain is gradually decreased.

10. Method according to claim 8 wherein the method starts with a gain value so small that the system will not oscillate.

11. Method according to claim 8 wherein the gain value is gradually increased by a first predetermined amount as long as the oscillation detecting means does not detect an oscillating state of the feedback system, the gain value is decreased by a second predetermined amount when the oscillation detecting means detects an oscillation state of the feedback system, and the resulting gain value is latched.

12. Method according to claim 11, wherein the first and second predetermined amounts are equal.

13. Method according to claim 11 wherein the first and second amounts can be set externally.

* * * * *